Oct. 18, 1932.   W. B. FAGEOL   1,883,357
RAIL CAR
Filed May 29, 1928   4 Sheets-Sheet 1

Oct. 18, 1932.  W. B. FAGEOL  1,883,357
RAIL CAR
Filed May 29, 1928   4 Sheets-Sheet 3

Patented Oct. 18, 1932

1,883,357

UNITED STATES PATENT OFFICE

WILLIAM B. FAGEOL, OF KENT, OHIO, ASSIGNOR TO TWIN COACH COMPANY, OF KENT, OHIO, A CORPORATION OF DELAWARE

RAIL CAR

Application filed May 29, 1928. Serial No. 281,477.

The present invention relates to new and useful improvements in rail cars.

In rail cars in general use the car body is supported at its forward and rear ends on trucks that are united to the body in such a way that the trucks can turn with respect to the body about vertical axes disposed adjacent the forward and rear end of the body. In such constructions the trucks are generally of very heavy construction and the motors are carried by the trucks. In view of the weight of these trucks and the parts carried thereby and the number of wheels embodied therein the operation of rail cars is generally noisy and much power is wasted, due to the unnecessary dead weight of the body and the trucks that support it.

The primary object of this invention is to provide an extremely simple rail car construction in which the number of, and weight of the parts is greatly reduced, and in which the use of relatively heavy trucks is entirely avoided.

A further object of the invention is to provide a rail car in which the body is constructed of relatively light structural material, and in which the body is utilized to support the motors whereby the use of trucks having relatively heavy motor supporting members may be entirely avoided.

A still further object of the invention is the provision of a rail car comprising a body and power and driving mechanism supported by the body in balanced relation thereto and so disposed as not to project into the body in such manner as to reduce the maximum carrying capacity of the body.

A still further object of the invention is to provide a rail car of a truckless type wherein the wheels thereof are driven individually by separate motors, thus avoiding the use of differential mechanisms.

A still further object of the invention is the provision of a rail car comprising a body, wheel supporting axles, cushioning means between said body and said axles, power units supported by said body, and power transmission means flexibly connected with said power units and said wheels.

A still further object of the invention is the provision of a rail car comprising a body, a pair of drive wheels adjacent each end of said body, power units supported by said body, and power transmission means flexibly connected with each of said wheels and said power units so as to permit each wheels to shift independently of every other wheel.

A still further object of the invention is the provision of a rail car comprising a body supported by a pair of axles each of which is supported by individually flexibly mounted separately driven wheels.

Other objects of the invention and the means by which the enumerated objects are accomplished as well as the advantages derived therefrom will be referred to in the course of the following description.

For a more complete understanding of the invention reference will be made to the accompanying drawings forming part of this application, and in which—

Figure 3 is a similar view disclosing a further modified and the preferred form of my invention.

Figure 6 is a transverse sectional view of the housing and wheel carried thereby representing the preferred embodiment of the invention illustrated in Figure 3.

Figure 7 is an inner side view of the construction shown in Figure 6 with the supporting axle in section, and Figure 8 is a top plan view of a portion of the structure shown in Figures 6 and 7.

Referring to the drawings by reference characters in which like characters designate like parts, 10 designate a body construction which may be of any suitable size and design, but as represented comprises a frame consisting of a pair of longitudinally extending, preferably channel shaped, supporting members 11 and transversely extending bars 12, the latter being arranged relative to members 11, so as to furnish the most effective support for the power units or transmission devices that may be supported thereby.

Figures 4, 5:
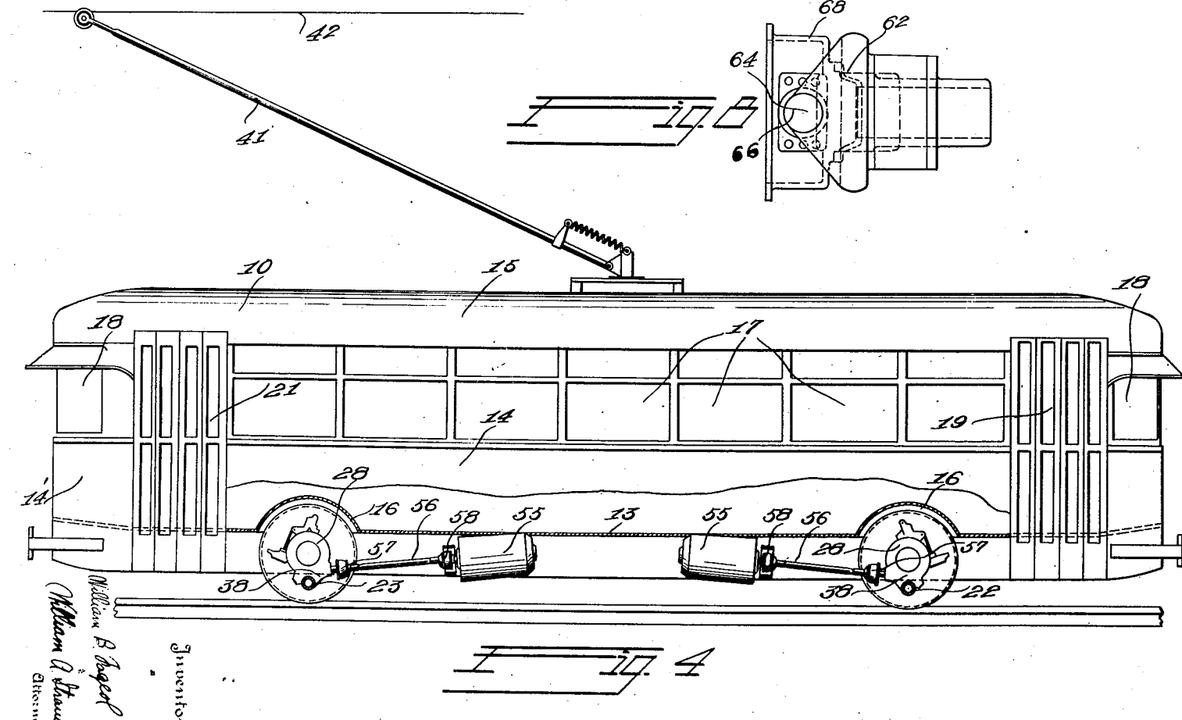
Figure 4 is a side elevational view partly broken away and in section of a form of the invention similar to that disclosed in Figure 3.
Figure 5 is a partial side elevation and partial section of one end of an axle, housing and wheel carried thereby, representing the construction disclosed in Figures 1 and 2.

Suitably constructed side and end walls 14 and 14' are supported on members 11 and 12 and a roof or top 15 is suitably supported on walls 14 as represented in Figure 4. As shown in Figure 4, suitable housings 16 project through a floor 13 arranged on frame members 11 and 12, for a purpose later to be described.

The body thus described is preferably constructed of relatively light structural steel frame members that, in view of its box-like or trussed character, is of great rigidity and strength and, accordingly, capable of supporting the motors or power units either by suspension of the motors from the under side thereof, or by supporting them on the frame members of the body adjacent the sides thereof, in a manner presently to be described.

As represented in Figure 4, side walls 14 may be provided with a plurality of windows 17 and end walls 14' may be provided each with one or more windows 18. Suitable doors 19 and 21 may be provided in sides 14 adjacent the front and rear ends of the body respectively and preferably on both sides thereof. Seats will be arranged within body 10 when used for carrying passengers and one or more of the seats may be arranged over housings 16 in order to utilize the entire floor area of the body.

Members 11 and 12 are of relatively light weight and as above stated, floor 13, sides 14, and ends 14' and roof 15 are united therewith in such manner as to provide a relatively light and yet very strong and durable body construction, dispensing with the usual heavy frame upon which the body is supported.

As shown in Figure 4, sides 14 and ends 14', preferably extend downward considerably below floor 13 into proximity to the ground thus practically concealing the driving mechanism hereinafter described and consequently presenting a more sightly body construction.

While the body 10 is shown as adapted for carrying passengers it will be obvious that bodies adapted for the transportation of merchandise, mails, etc. may be provided, the main desideratum being that the body be constructed as above set forth.

Body 10 is yieldably supported on front and rear axles 22 and 23 respectively by means of suitable leaf spring assemblies 24, the intermediate portions of which are secured to axles 22 and 23 adjacent the ends thereof by means of suitable clips 25 and one corresponding set of ends of which are pivotally secured to members 11 of body 10 at 26 and the opposite ends of which are shackled to members 11 as indicated at 27. In the forms of the invention illustrated in Figures 1, 2, 4 and 5, each axle 22 and 23 has fixedly secured to each end thereof a housing 28 in which is rotatably journaled a shaft 29 provided with a head in the form of a disk 31 to the outer face of which the inner marginal flange 32 of a dished disk wheel body 33 is detachably secured by means of screw bolts 34. A flanged rim 33' is secured to the outer periphery of body 33, as indicated in Figure 5. An internal brake drum 35 is also detachably secured to head 31 by means of the screw bolts 34 adapted to cooperate with suitable brake shoes operatively carried by housing 28 within the drum.

A worm wheel 36 is fixed on shaft 29 within housing 28 in meshing engagement with a worm 37 rotatably journaled in an enlarged section 38 in housing 28.

Figure 1:
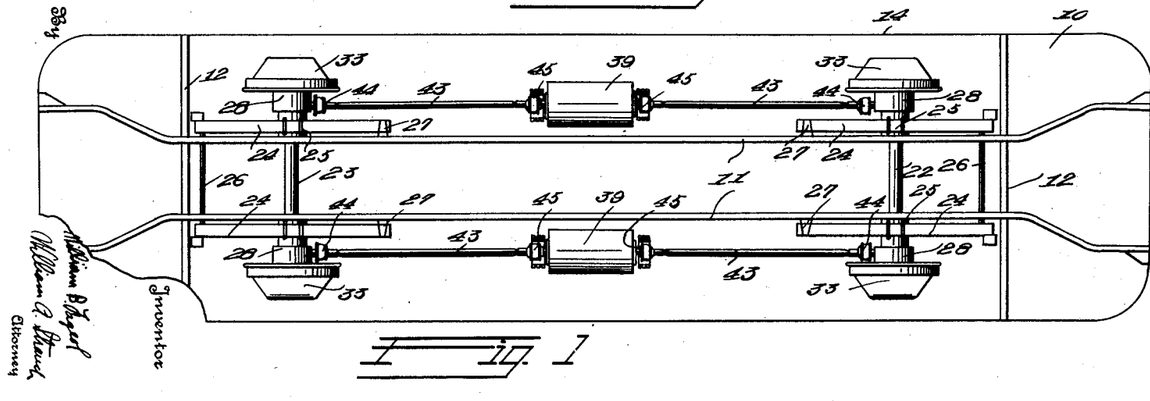
Figure 1 is a top plan view of the wheels and driving means therefor of a rail car embodying one form of my invention, the body being shown in outline.

In the form of the invention represented in Figure 1, an electric motor 39 is arranged adjacent each side of body 10 intermediate the ends thereof and is suitably secured beneath the floor 13 in the manner represented in Figure 4, motors 39 receiving operating current from any suitable source as e. g. from a trolley as indicated at 41 in Figure 4 from a conductor 42. Each motor 39 has a drive shaft 43 extending therefrom in opposite directions toward the adjacent housings 28 at each side of body 10. Each shaft at the end thereof adjacent housing 28 is flexibly secured to worm 37 by means of a suitable flexible coupling 44. Each shaft 43 is made flexible adjacent each motor 39 by means of a similar flexible coupling 45.

Thus in the form of the invention disclosed in Figure 1 a rail car is provided comprising a body provided with a pair of front drive wheels and a pair of rear drive wheels, the front and rear wheel at each side of the body being independently driven by a separate motor whereby the wheels on opposite sides may be driven at different speeds as may be necessitated upon rounding a curve in the track upon which the rail car is traveling. Moreover, in case of loss of traction of one or more of the wheels the remainder will serve to propel the car. Body 10 is yieldably supported from axles 22 and 23 by means of springs 24 as above stated, thus providing a comfortable riding car. At the same time the flexible drive connections permit the relative movement between body 10 and axles 22 and 23 permitted by springs 24, without affecting the drive connections between gears 36 and motors 39.

Figure 2:
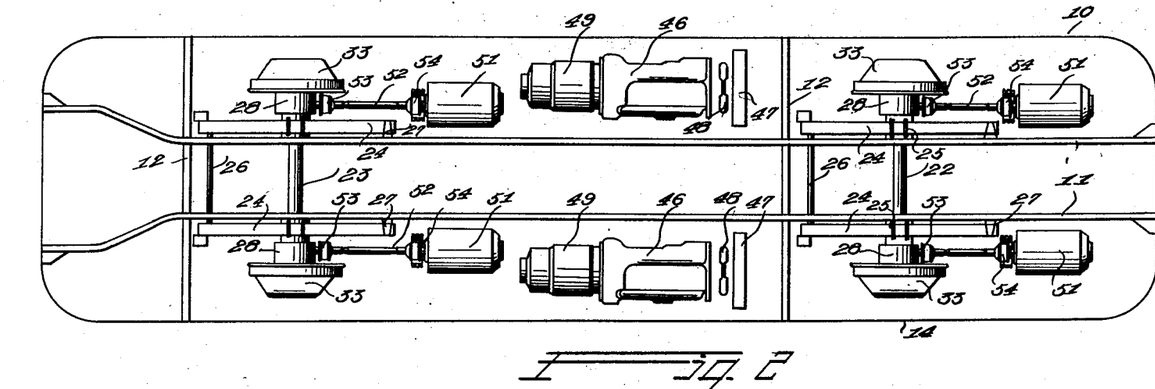
Figure 2 is a view similar to Figure 1 of a modified form of my invention.

In the form of invention disclosed in Figure 2, a gas-electric construction is provided which comprises an internal combustion or gas engine 46 adjacent each side of body 10 intermediate the ends thereof. These engines are supported on the frame of the body and preferably project up into the body adjacent the sides thereof as indicated in outline in Figure 2. In this form of the invention additional housings of suitable form and dimensions may be provided in floor 13 to accommodate the portions of engines 46 that project above floor 13 as well as the radiators 47 and fans 48 forming a part of the cooling system of said engines. As the projections into the car body are arranged adjacent the sides thereof, said engines may be housed beneath seats disposed adjacent said sides.

A generator 49 is provided for each gas engine 46 for the conversion of the mechanical energy of engines 46 into electrical energy for the operation of electric motors 51, one of which is provided for each wheel 33, whereby the wheels 33 are all independently driven, thus reducing the probabilities of complete loss of traction to a minimum.

In this form of the invention the connection between motors 51 and housings 28 are similar to those described in connection with the form of invention disclosed in Figure 1 and comprise a shaft 52 interposed between each motor 51 and respective wheel 33, shafts 52 being flexibly connected to worms 37 in housings 28 by means of flexible couplings 53 and flexibly connected at their opposite ends to motors 51 by means of flexible couplings 54.

In this form of the invention as in the first form, motors 51 are suitably secured beneath floor 13 and their weight is sustained by the frame of the body. According to this form of the invention, the driving power is furnished by self contained power units and a rail car is accordingly provided which is not dependent upon energy from a distant source as in the forms disclosed in Figures 1 and 4 and consequently the car can travel on tracks constructed for use of steam locomotives, without any additional expenditure of capital on the track.

Furthermore, in this form of the invention the four wheels are all separately and independently driven thus providing a more flexible construction and one in which the motors individual to the wheels automatically compensate for the different rates of rotation of the wheels upon traveling over a curved section of track.

In Figure 4 is represented a form of rail car provided with a motor 55 individual to each wheel 33 and secured to or suspended from the bottom of the body 10. In this form of the invention the motors 55 are symmetrically disposed between the wheels 33 whereas in the form disclosed in Figure 2, motors 51 are disposed on the same side of their respective wheels 33, such arrangement being desirable to provide room for the gas engines 46. It will be noted that in all the forms so far described the power and transmission mechanism is supported on or suspended from the body 10 in such manner that the weight thereof will be substantially equally distributed and in balanced relation with respect to the transverse and longitudinal center lines, of the car body thus providing an arrangement in which vibration is reduced to a minimum and in which light structural members secured together in box-like form can adequately resist the strains imposed on it by the weight of the power units.

Motors 55, in the form of invention disclosed in Figure 4, are operatively connected with their respective wheels 33 through individual drive shafts 56 flexibly connected to worms 37 by means of flexible couplings 57 and flexibly connected to motors 55 by means of flexible couplings 58. In this form of the invention electric energy is supplied to motors 55 through trolley pole 41 as in common trolley car practice.

In the forms of the invention so far described, the wheel supporting housings 28 are rigidly fixed to axles 22 and 23. In such constructions wheels 33 are compelled to remain in planes parallel to the sides of body 10. These arrangements are intended for use on track that includes no relatively sharp curves.

It has been found that in order to run a four-wheel rail car of more than 7-foot wheel base around a curve of not more than 35 foot radius it is necessary to have the wheels turn about vertical axes in order that they may readily follow a track curved to the degree just stated and remain in position thereon. As a matter of safety even on straight lines of track in order to compensate for uneven ends of rails, splinters or defective switches, flexibility of the type about to be described is desirable. The preferred embodiment of the invention illustrated in Figures 3, 6, 7 and 8 comprises means for providing such flexibility in the wheels for adequately meeting the conditions just set forth.

In this form of the invention, the opposite ends of axles 22 and 23 each have rigidly secured thereto by bolts 59 and 61 upper and lower brackets 62 and 63 respectively provided with vertically aligned apertures 64 and 65 respectively. Rotatably mounted in said apertures are trunnions 66 and 67 rigidly secured at the inner ends thereof to a sectional housing 68 comprising sections 68' and 68'' secured together by bolts 69. Each trunnion is provided with a cap 70 secured thereto by a screw 71 extending centrally thereinto. Such construction in effect provides steering knuckles similar to those employed on the front or steering wheels of a road vehicle. Extending centrally through housing 68 normally parallel to axle 22 or 23 is a shaft 72 rotatably journaled in bearings 73 and 74 supported in housing 68, the shaft on the outer end thereof being provided with a disk head 75 and at the inner end thereof being threaded and provided with a nut 76 in engagement with a washer 77 bearing against the outer face of the inner wall of housing 68 and bearing 74 thus holding shaft 72 in operative position in housing 68.

Detachably secured to head 75 by means of screw bolts 78 is a flange 79 of a disk wheel body 81 provided with an integral channeled rim member 82. Resting in the channel of rim member 82 is the base of a circumferential rubber cushion 83 which is preferably rectangular in section and centrally circumferentially apertured at 84 for aiding in the cushioning properties thereof. An oppositely facing channel shaped outer rim member 85 rests upon and surrounds the outer periphery of cushion 83, the opposing flanges of rim members 82 and 85 being normally in spaced relation as indicated in Figures 6 and 7 for permitting relative movement thereof against the action of cushion 83. Rigidly secured to the outer circumferential face of rim member 85 is a flanged tire or track engaging member 86.

As clearly disclosed in Figure 6, wheel body 81 is of somewhat dished formation including a cylindrical portion adjacent inner rim member 82 providing an internal brake drum 87 for cooperation with suitable brake shoes 88 pivotally supported by housing 68 and adapted to be operated by a cam actuating member 89 carried by a shaft 91 rotatably journaled in housing 68 for manipulation by an arm 92 adapted for suitable connection with a brake rod.

Secured to a shaft 72 adjacent bearing 74 is a worm gear 93 meshing with a worm 94 rotatably journaled in an enlargement 95 of housing 68. Upper bracket 62 is provided with an aperture 96 into which projects and through which is accessible a cap 97 detachably secured to housing 68 by bolts 98 and enclosing nut 76. Bearing 73 is supported in a flanged casting 99 normally engaged therewith and a flange 101 on shaft 72 and a centrally apertured cap 102 receives the outer end of shaft 72 and is marginally secured to the outer end of housing 68 by bolts 103 which bolts also extend through the flange of casting 99 for securing same in position.

By means of the construction just described, wheel body 81 can readily be removed by the simple operation of removing screw bolts 78 whereupon access is gained to the brake mechanism making the repair, adjustment or renewal thereof a comparatively simple operation and consequently a speedy and inexpensive operation. After having removed wheel body 81 by removing cap 97 nut 76 and cap 102, shaft 72 can be readily removed with bearing 73 and casting 99 whereupon if necessary worm gear 93 can be removed by releasing the nuts from bolts 69 and separating sections 68' and 68'' of the housing 68.

In this form of the invention, and as clearly indicated in Figure 3, each housing 68 is provided with an arm 104 to each transversely aligned pair of which the opposite ends of a rod 105 are pivotally secured at 106 for maintaining housings 68 of each transversely aligned pair thereof as well as wheels 81 carried by housings 68 in parallel relation. An electric motor 107 secured to floor 13 is provided for each wheel 81 which motors are adapted to receive electric energy through a trolley as in Figure 4 or a gas-electric combination as represented in Figure 2 may be provided if desired. Each motor 107 is operatively connected with a wheel 81 by means of a drive shaft 108 which at one end thereof is flexibly connected to worm 94 by a flexible coupling 109 and which at the opposite end thereof is flexibly connected to the drive shaft of a motor 107 by a flexible coupling 111.

In accordance with this form of the invention, all four wheels are separately and independently driven and each wheel is provided with a brake structure and has a steering knuckle connection between its supporting housing and an axle, thus providing a rail car of extremely light but durable construction, consisting of few parts.

As indicated in Figure 3, wheels 86 due to their steering knuckle connections to housings 68 readily conform to curved sections of track, the wheels being guided or steered by means of the cooperation between the wheel rim flanges and the track rails, each pair of front and rear wheels being maintained in parallel relation by means of the connecting rods 105 and due to the body supporting axles 22 and 23 being located below the wheel centers as indicated in Figure 6 there is no tendency for the flanges of the wheels to climb over the track rails to derail the car.

The construction disclosed in Figure 3 is also admirably adapted to tracks embodying any irregularities. Wheels 86 may be driven by means of conventional type axles embodying differentials driven by one or two internal combustion engines. When employing conventional type axles universal joints would obviously be positioned in the drive axle sections with the centers of such joints in alignment with the pivotal axes of the steering knuckles.

It will be observed further that in view of the absence of the ordinary driving trucks, embodying in some instances four-wheel pony trucks, that the weight of a vehicle constructed in accordance with the disclosure of this application is greatly reduced, and that the vehicle described can be operated on rails with a minimum amount of noise in view of the lightness of the construction and the readiness with which the individual wheels adapt themselves to slight irregularities in the track and to the outline of the track in rounding curves. A further reduction in the noise of operation is effected by virtue of the fact that only four wheels are utilized and each wheel is individually resiliently united to the body. Furthermore, the floor line of the body may be brought relatively close to the ground in view of the fact that the axles 22 and 23 may be substantially offset with respect to the center of the wheels as previously pointed out. The center of gravity of the vehicle is accordingly, substantially lowered, making it practicable to operate the vehicle at relatively high speeds without danger of overturning. At the same time the lowered floor line results in a construction in which the mounting of the vehicle can be accomplished with a minimum of difficulty. The reduction in the weight of the parts and the simplification of the running gear of the car makes it possible to dispense with the ordinary heavy frame members heretofore embodied in the construction of the car trucks and of the car body. A rail car is accordingly produced that can be manufactured at greatly reduced cost, that requires less power to operate and that results in a construction that will run comparatively noiselessly at a relatively high rate of speed without substantial danger of overturning.

While the steering trunnions 66 and 67 of wheels 86 are disclosed as being located laterally inward of the planes of the wheel rims 82, trunnions 66 and 67 may be disposed in the planes of the wheel rims 82 in order to offset or balance the turning offset resulting from braking or driving on any one wheel by setting upon opposing couples about the axes of the trunnions.

From the foregoing disclosure it will be seen that a novel rail car is provided comprising a body well adapted for carrying passengers or the transportation of merchandise and that driving mechanism is associated with the body in such manner as not to interfere with the carrying capacity thereof.

It will be seen further that in all the forms of the invention disclosed the driving mechanism is so aranged beneath the floor of the body as to substantially equally distribute the weight thereof thus avoiding any unbalanced weight, and permitting the use of relatively light structural body frame members.

While I have disclosed certain embodiments of my invention, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. Accordingly, what is desired to be secured by Letters Patent and is claimed as new is:—

1. A rail car comprising a body, an axle adjacent each end of said body; a pair of independently mounted leaf springs yieldably connecting each of said axles to said body; a housing carried by each end of each of said axles; a wheel rotatably supported by each of said housings; and means supported by said body for imparting rotation to said wheels for propelling said car, the wheels on one side of said body being driven independently of those on the other side thereof.

2. A rail car comprising a body; an axle adjacent each end of said body; springs independently connecting said axles to said body; a housing carried by each end of each of said axles; a shaft journalled in each of said housings; a wheel carried by each of said shafts; each wheel provided with an annular flanged rail engaging section and an annular non-metallic shock absorbing insert adjacent said flanged section; power units supported by said body at opposite sides thereof in balanced relation to a line passing centrally longitudinally through said body; and driving connections between said power units and said shafts comprising a worm gear secured to each of said shafts; a worm journalled in each housing in mesh with said gears, and driving shafts flexibly connected to each of said worms and said power units.

3. A rail car comprising a body; an axle yieldably supporting said body adjacent each end thereof; a housing carried by each end of each of said axles for pivotal movement about a vertical axis; a shaft rotatably journaled in each of said housings; a flanged rail engaging wheel secured to each of said shafts; a worm gear secured to each of said shafts; a worm journaled in each of said housings in mesh with each of said gears; power means supported by said body; and a drive shaft flexibly connected to each of said worms and to said power means.

4. The construction defined in claim 3 in which said shafts are disposed in a plane above that containing the axes of said axles.

5. The construction defined in claim 3 in which said power means comprises a pair of electric motors; each of said motors operatively connected to a pair of said drive shafts.

6. The construction defined in claim 3 in which said power means comprises an electric motor supported by said body and operatively connected to each of said drive shafts; internal combustion engines supported by said body; and generators supported by said body for converting the energy of said engines into electric energy for said motors.

7. The construction defined in claim 3 in which said power means comprises an electric motor operatively associated with each of said drive shafts.

8. A rail car comprising a body; an axle yieldably supporting each end of said body; a housing flexibly connected to each end of each of said axles; a shaft journaled in each of said housings above said axles; a rail engaging wheel detachably supported by each of said shafts; a gear carried by each of said shafts; a worm operatively associated with each of said gears; a drive shaft flexibly connected to each of said worms; and means carried by said body for imparting rotation to said drive shafts.

9. The construction defined in claim 8 in which said flexible connection comprises a pair of brackets supported by each end of each of said axles and provided with vertically aligned apertures; and trunnions carried by said housings pivotally engaged in said apertures.

10. A rail car comprising a box-like body of relatively light structural material; a pair of axles disposed beneath said body; springs yieldably connecting said axles to said body; a wheel having a rail engaging flange supported adjacent the end of each axle for swiveling movement about a substantially vertical axis, power means carried by said body and flexible shafts for operatively connecting said power means to each of said wheels.

11. A rail car comprising a box-like body of relatively light structural material; a pair of axles disposed beneath said body; springs yieldably connecting said axles to said body; a wheel supported adjacent the end of each axle for swiveling movement about a substantially vertical axis; a motor for each wheel supported by said body; said motors being disposed adjacent the sides thereof in balanced relation with respect to a line passing centrally transversely through said car body and a flexible drive shaft operatively connecting each of said wheels with one of said motors.

12. A rail car comprising a body, a pair of axle sections beneath said body; springs yieldingly connecting said axle sections to said body; a pair of wheels having rail engaging flanges secured to each axle section for swivelling movement about a substantially vertical axis, power means carried by said body, flexible drive means operatively connecting said wheels with said power means; and means interconnecting said pair of wheels for simultaneous swivelling movement.

13. A rail car comprising a body, a dead axle arranged beneath each end of said body, a pair of housings secured adjacent each end of said axle, live axle sections and driving mechanisms in each of said housings, a wheel attached to each of said live axle sections, a pair of leaf springs independently yieldingly attaching each axle to said body, and driving means for each of said live axle sections attached to and housed beneath said body and arranged in substantially balanced relation with respect to the longitudinal center line of the body.

14. A rail car construction comprising a body, a pair of axles supporting said body, springs connecting said axles separately to said body, a pair of wheels supporting each axle, each wheel being mounted for swivelling movement with respect to the axle to which it is attached about a substantially vertical axis, and including driving mechanism, and power units carried by and housed beneath said body, said power units being operatively connected to said wheels.

15. A rail car construction comprising a body, a pair of axles supporting said body, springs connecting said axles separately to said body, a pair of wheels supporting each axle, each wheel being mounted for swivelling movement with respect to the axle to which it is attached about a substantially vertical axis and including driving mechanism, a motor for each wheel carried by and housed beneath said body, and a flexible drive shaft interconnecting each of said motors with the driving mechanism of one of said wheels.

16. A rail car construction comprising a body, a pair of axles supporting said body, springs connecting said axles separately to said body, a pair of wheels supporting each axle, each wheel being mounted for swivelling movement with respect to the axle to which it is attached about a substantially vertical axis and including gearing disposed so that the teeth thereof when the wheel is in normal position are approximately bisected by the vertical plane containing said axis, motors carried by and housed beneath said body and flexible drive shafts connecting said motors to the gearing of each of said wheels.

17. An electrically driven vehicle comprising a body, an axle supporting one end of said body, said axle consisting of a central portion and housings attached at each end to said central portion, each of said housings including bearings for a live axle section arranged so that the axis of said section is disposed substantially above said central portion, live axle sections carrying wheels mounted in said bearings, gearing to drive said sections disposed in said housings, motors suspended from beneath said body, and flexible drive shafts connecting said motors and gearing.

18. An electrically driven vehicle comprising a body, an axle supporting one end of said body, said axle consisting of a central portion and housings attached at each end to said central portion for swivelling movement about substantially vertical axes, each of said housings including bearings for a live axle section arranged so that the axis of said section is disposed substantially above said central portion, live axle sections carrying wheels mounted in said bearings, gearing to drive said sections disposed in said housings so that the teeth thereof are disposed approximately under normal conditions between vertical planes arranged relatively close to and at opposite sides of the vertical plane containing the axis of said swivelled connection between said housings and central portions, motors suspended from beneath said body, and flexible drive shafts connecting said motors and said gearing.

19. An electrically driven vehicle, comprising a body, an axle supporting one end of said body, said body consisting of a central portion and housings attached at each end of said central portion for swinging movement with respect to said central portion about an axis substantially vertically disposed, bearings for a live axle section in each of said housings arranged so that the axis of said section is located substantially above said central portion, live axle sections carrying wheels mounted in said bearings, a worm gear keyed on each of said sections and disposed so that the axis of said swivelled connection between the housing and said central portion passes substantially through the center of said worm gear, a worm journaled in said housing and operatively connected to said worm gear, motors suspended from beneath said body and flexible drive shafts connecting said motors and worms.

In testimony whereof I affix my signature.

WILLIAM B. FAGEOL.